(12) United States Patent
Chang

(10) Patent No.: US 8,086,757 B2
(45) Date of Patent: Dec. 27, 2011

(54) INTELLIGENT GATEWAY FOR HETEROGENEOUS PEER-TO-PEER HOME AUTOMATION NETWORKS

(76) Inventor: Michael Alan Chang, Saratoga, CA (US)

( * ) Notice: Subject to any disclaimer, the term of this patent is extended or adjusted under 35 U.S.C. 154(b) by 25 days.

(21) Appl. No.: 12/730,042

(22) Filed: Mar. 23, 2010

(65) Prior Publication Data

US 2011/0137436 A1 Jun. 9, 2011

(51) Int. Cl.
*G06F 15/16* (2006.01)
*G05B 11/01* (2006.01)
*G08C 19/16* (2006.01)
*H04J 3/00* (2006.01)

(52) U.S. Cl. ......... 709/246; 700/19; 700/20; 340/12.32; 370/464

(58) Field of Classification Search .................. 709/248; 700/1–4, 11, 19–20, 90, 286; 340/12.31–12.32, 340/12.52; 370/464–465, 479, 241, 252
See application file for complete search history.

(56) References Cited

U.S. PATENT DOCUMENTS

| | | | |
|---|---|---|---|
| 5,675,503 A | 10/1997 | Moe et al. | |
| 6,879,806 B2 | 4/2005 | Shorty | |
| 6,891,478 B2 | 5/2005 | Gardner | |
| 7,136,709 B2 | 11/2006 | Arling et al. | |
| 7,417,397 B2 | 8/2008 | Berman et al. | |
| 7,865,252 B2 | 1/2011 | Clayton | |
| 7,884,727 B2 | 2/2011 | Tran | |
| 2003/0233201 A1* | 12/2003 | Horst et al. | 702/62 |
| 2005/0232283 A1* | 10/2005 | Moyer et al. | 370/401 |
| 2006/0259183 A1 | 11/2006 | Hayes et al. | |
| 2007/0112939 A1 | 5/2007 | Wilson et al. | |
| 2007/0192486 A1 | 8/2007 | Wilson et al. | |
| 2008/0183307 A1 | 7/2008 | Clayton et al. | |
| 2008/0279161 A1 | 11/2008 | Stirbu et al. | |
| 2009/0020233 A1 | 1/2009 | Berman et al. | |
| 2009/0066534 A1 | 3/2009 | Sivakkolundhu | |
| 2009/0217335 A1 | 8/2009 | Wong et al. | |
| 2009/0254222 A1 | 10/2009 | Berman et al. | |
| 2010/0076615 A1 | 3/2010 | Daniel et al. | |
| 2010/0082176 A1 | 4/2010 | Chang | |
| 2010/0121968 A1* | 5/2010 | Clark | 709/230 |

OTHER PUBLICATIONS

Office Action in U.S. Appl. No. 12/489,378, dated Feb. 28, 2011.
Chemishkian, S., "Building Smart Services for Smart Home," Jan. 2002, Proceedings of the 2002 IEEE 4th International Workshop on Networked Appliances, IEEE Xplore Online, pp. 215-224.
Kim, T. et al., "Shortcut Tree Routing in ZigBee Networks," Feb. 2007, Second International Symposium on Wireless Pervasive Computing, IEEE Xplore Online, pp. 42-47.

(Continued)

*Primary Examiner* — Joon H Hwang
*Assistant Examiner* — Thomas Lee, IV
(74) *Attorney, Agent, or Firm* — Nixon Peabody LLP; John P. Schaub (57) ABSTRACT

A solution for home automation management includes, at a network device configured to support multiple home automation technologies, receiving a message from a first home automation control device (HACD) managed by the network device, towards a second HACD managed by the network device. The network device translates the message to a form recognizable by the second HACD, and then sends the translated message towards the second HACD in accordance with home automation technology supported by the second HACD. According to one aspect, the solution may be extended to a network of multiple network devices configured to support multiple home automation technologies.

21 Claims, 8 Drawing Sheets

OTHER PUBLICATIONS

Oh, H.W. et al., "A Power Saving System Based on Energy-Aware Control Elements in Ubiquitous Home Network," Apr. 2008, IEEE International Symposium on Consumer Electronics, IEEE Xplore Online.

Palensky, P. et al., "Demand Side Management in Private Homes by Using LonWorks," Oct. 1997, 1997 IEEE International Workshop on Factory Communication Systems, IEEE Xplore Online, pp. 341-347.

Rao, K. S. R. et al., "PC Based Energy Management and Control System of a Building," 2004, 2004 Proceedings of National Power and Energy Conference, pp. 200-204.

Shwehdi, M. H. et al., "A Power Line Data Communication Interface Using Spread Spectrum Technology in Home Automation," Jul. 1996, IEEE Transactions on Power Delivery, vol. 11, No. 3, pp. 1232-1237.

Tsai, C. et al. "MASSIHN: A Multi-Agent Architecture for Intelligent Home Network Service," Aug. 2002, IEEE Transactions on Consumer Electronics, vol. 48, Iss. 3., pp. 505-514.

Tsang, K.F. et al., "An Integrated ZigBee Automation System: An Energy Saving Solution," Dec. 2007, 14th International Conference on Mechatronics and Machine Vision in Practice, IEEE Xplore Online, pp. 252-258.

Williams, E. et al., "Use of a Computer-Based System to Measure and Manage Energy Consumption in the Home," May 2006, Proceedings of the 1996 IEEE International Symposium on Electronics and the Environment, IEEE Xplore Online, pp. 167-172.

Allan Chen, a_chen@lbl.gov, Automated Demand Response, How the internet helps the electricity grid in California, Science@Berkeley Lab, Mar. 5, 2008.

INSTEON™ Development Kit—Serial, http://www.smarthome.com/insteon/sdk2600S.html, Sep. 15, 2008, 3 pages.

Paul Darbee, INSTEON Compared, copyright 2006 SmartLabs, Inc., Jan. 2, 2006, 69 pages.

Zwave® The Standard in Wireless Home Control, Remote Home Management, Safety & Security, Energy Conservation, Entertainment Control, Comfort & Convenience, Zensys Inc., www.zen-sys.com, 6 pages.

Bob Heile, Chairman, ZigBee™ Alliance, Wireless Control That Simply Works, Wireless Sensors and Control Networks: Enabling New Opportunities with ZigBee, Dec. 2006, 27 pages.

IEC Intelligent Technologies™, A LONWORKS® Technology Tutorial, http://www.ieclon.com/LonWorks/LonWorksTutorial.html, Sep. 22, 2008, 15 pages.

Electronic design, EMBEDDED, EiED Online>>Insteon Now, http://electronicdesign.com/Articles/Index.cfm? AD=1&AD=1&AD..., Sep. 15, 2008, 4 pages.

U.S. Appl. No. 12/489,378, filed Jun. 22, 2009.

Office Action in U.S. Appl. No. 12/489,378, mailed May 10, 2011.

Cuevas, R. et al., "P2P Based Architecture for Global Home Agent Dynamic Discovery in IP Mobility," IEEE 65th Vehicular Technology Conference, Apr. 2007, ISSN: 1550-2252, pp. 899-903.

Hlavacs, H. et al., "Distributed Energy Efficiency in Future Home Environments," Annals of Telecommunications, vol. 63, Nos. 9-10, Dec. 2007, pp. 473-485.

Lee, I. et al., "A Development of Application Service on the Peer-to-Peer Based Virtual Home Platform," The 9th International Conference on Advanced Communication Technology, Feb. 2007, pp. 1579-1582.

Turcan, E. et al., "Peering the Smart Homes," Proceedings of the First International Conference on Peer-to-Peer Computing, IEEE Computer Society, 2002.

Bapst, U. et al., "ARIGO-A Peer-to-Peer Home Automation Network," IBM Technical Disclosure Bulletin, vol. 38, No. 09, Sep. 1995, IP.com Prior Art Database, pp. 217-222.

* cited by examiner

INTELLIGENT GATEWAY FOR HETEROGENEOUS PEER-TO-PEER HOME AUTOMATION NETWORKS

CROSS REFERENCE TO RELATED APPLICATIONS

This application is related to U.S. patent application Ser. No. 12/489,378 filed Jun. 22, 2009, entitled "Peer-to-Peer Home Automation Management," the contents of which are incorporated by reference in their entirety.

FIELD OF THE INVENTION

The present invention relates to the field of computer science. More particularly, the present invention relates to an intelligent gateway for heterogeneous peer-to-peer home automation networks.

BACKGROUND OF THE INVENTION

Home automation, otherwise known as domotics or smart homes, is an up and coming technology that is integrating itself into the modern life of people across the world. As the practical uses of home automation become apparent to the public, numerous types of home automation technologies have grown and gained popularity. Competing technologies are available from Zigbee®, Z-Wave® (now Sigma Design), Echelon®, SmartLabs (Insteon™), and others. These are proprietary home automation solutions which operate in proprietary home networks.

In U.S. application Ser. No. 12/489,378 ("'378 application"), Chang teaches a system of home automation where the communication between Home Automation Control Devices (HACDs) is implemented through a peer-to-peer network, rather than a centralized server. The '378 application discloses peer-to-peer intelligence to household or commercial building devices such that devices equipped with HCADs can negotiate with one another to determine an optimal way to control behavior of the devices in order to achieve a desired result such as a specific energy saving goal.

The '378 application further discloses a home automation network comprising a cluster of HACDs that conform to one specific home automation technology (such as Insteon™, for example) and collaborate with one another in a peer-to-peer manner to achieve a goal designated by the user. Such a network may be used within a location such as a household or a commercial building.

As the deployment of home automation products becomes more prevalent, consumers face an increasing number of technology choices in deploying home automation devices. If two rooms in the same household each deploys a different proprietary home automation technology, the home automation devices in one room will not be able to interoperate with home automation devices in a different room. For example, an Insteon™-based device is incapable of directly conferring with an Echelon®-based device to perform a joint operation. If a first and second neighboring houses on the same street each deploys a different home automation technology and network, then home automation devices in the first house will not be able to interoperate with the home automation devices in the second house.

On a larger scale, the home automation devices deployed in each household in close proximity (such as areas defined by an electric outage rotating block of an electricity utility company) could be potentially used by electricity utility companies to diminish the necessity of brownouts during times of high energy consumption. However, the probability that all of the homes in the same outage rotating block use the exact same type of home automation technology when so many viable technologies are available on the market is slim.

Accordingly, a need exists for an improved solution for home automation management. More particularly, a need exists for such a solution that enables HACDs belonging to different home automation technology networks to interoperate with one another in a peer-to-peer manner to achieve a specific objective.

SUMMARY OF THE INVENTION

A solution for home automation management includes, at a network device configured to support multiple home automation technologies, receiving a message from a first home automation control device (HACD) managed by the network device, towards a second HACD managed by the network device. The network device translates the message to a form recognizable by the second HACD, and then sends the translated message towards the second HACD in accordance with home automation technology supported by the second HACD. According to one aspect, the solution may be extended to a network of multiple network devices configured to support multiple home automation technologies.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of an intelligent gateway for heterogeneous peer-to-peer home automation networks. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

Example embodiments of the present invention feature a gateway device ("gateway") which is a network device that acts as a translator between multiple heterogeneous home automation networks comprising a cluster of HACDs, allowing home automation devices of one type on one network to seamlessly discover, communicate with and interoperate with home automation devices of different type on a different network in a peer-to-peer manner. The gateway may be implemented by incorporating multiple home automation technologies into one device and configuring the gateway to bridge the communication between devices on one home automation network and devices on a different home automation network. Multiple gateways can be interconnected to provide increased scalability. Depending on the technologies used to interconnect multiple gateways (such as the Internet), the gateways can also serve to extend the distance limitations inherent in each of the home automation technologies. Heterogeneous home automation technologies may interoperate in a peer-to-peer manner to achieve a specific objective while overcoming technology interoperability issues and distance limitation issues.

According to embodiments of the present invention, household or commercial building electrical appliances are equipped with a wireless or a power-lined (or both) HACD. The HACD and the appliance may be physically separate, or the appliance may comprise the HACD. Although the term "Home Automation" is used to describe specific embodiments of the present invention, embodiments of the present invention are not limited to a home environment. Embodiments of the present invention may also be applied in a commercial building environment.

According to one embodiment of the present invention, a HACD is a microcontroller-based device with memory storage capable of storing program instructions and intelligence and equipped with one or more of the technologies described earlier (such as Insteon™, Z-Wave®, ZigBee®, LonWorks®, etc.) to communicate with its peer devices and to determine the current electrical power usage of the electrical appliance the HACD is controlling. According to one embodiment of the present invention, an HACD comprises a 3-prong electric outlet which can be plugged into a standard household electric outlet and the appliance this HACD controls can be plugged into the HACD.

According to one embodiment of the present invention, a HACD comprises a user interface, such as an LCD display, configured to present a current task that has been designated by the user or other peer HACDs. The designated task can be altered by an optional numeric or alphabetical input pad on the HACD which the user can key in data. According to one embodiment of the present invention, a user enters into a HACD the desired energy saving numbers in watt-hours and/or energy saving percentage goal compared to a previous period. According to one embodiment of the present invention, a user enters the maximum power consumption of an appliance controlled by a HACD over a time period. According to another embodiment of the present invention, the user enters the priority level into a HACD to indicate the energy saving priority of the appliance it controls. According to yet another embodiment of the present invention, the current performance such as energy saved of a HACD controlled appliance is displayed on the LCD of the HACD. According to another embodiment of the present invention, the HACD comprises an override button on its panel such that once the button is pressed, the HACD will temporarily suspend any control of the appliance it controls until the override button is cancelled. In this scenario, the HACD will still continue to report and monitor the energy usage of the appliance it controls to other HACDs in the network.

According to one embodiment, a gateway is configured to operate in one of two modes. In a first operating mode, a single gateway serves multiple heterogeneous home automation networks. In a second operating mode, multiple networked gateways serve multiple heterogeneous home automation networks. The first operating mode is described below with reference to FIG. 1. The second operating mode is described below with reference to FIG. 2.

Figure 1:
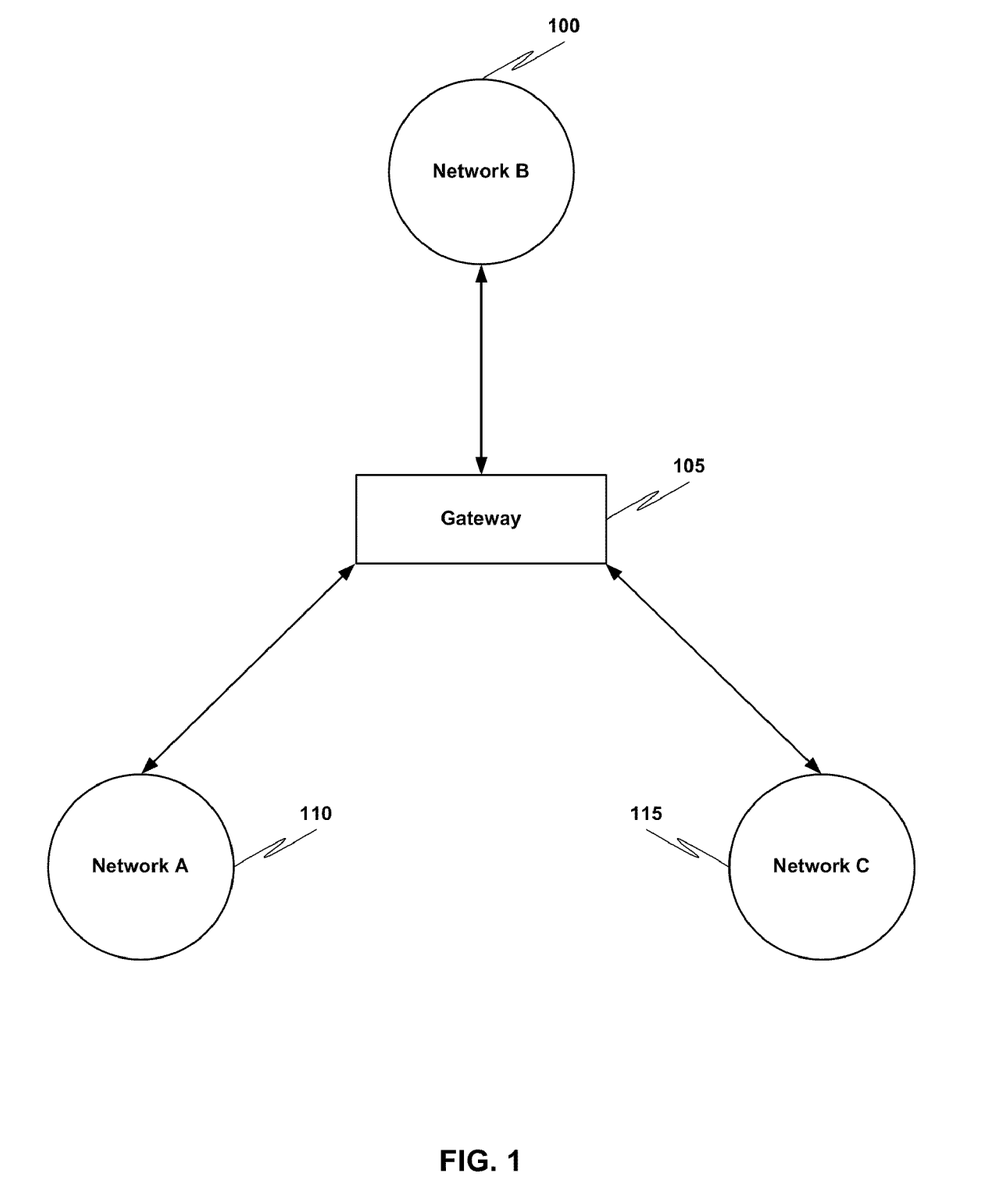
FIG. 1 is a block diagram that illustrates an intelligent gateway for heterogeneous peer-to-peer home automation networks in accordance with one embodiment.

FIG. 1 is a block diagram that illustrates an intelligent gateway for heterogeneous peer-to-peer home automation networks in accordance with one embodiment. According to one embodiment, a single gateway 105 serves multiple heterogeneous home automation networks (100, 110, 115). In this mode, one gateway 105 is deployed to bridge the communication between multiple home automation networks, each utilizing a different home automation technology. For example, Network 110 could be based on Insteon™ technology and network 100 could be based on Echelon® technology. Without the gateway 105, HACDs on network 110 would not be able to communicate and interoperate with HACDs on network 100. The gateway 105 bridges this gap by simultaneously incorporating multiple home automation technologies (for example, Insteon™ technology and Echelon® technology) and supports the preferred physical medium of communications (for example, power line, wireless, etc.) for the home automation technologies incorporated.

As shown in FIG. 1, through the function of the gateway 105, HACDs on Network 110 will appear to HACDs on Network 100 as if they were of the same home automation technology and on the same home automation network. Similarly, HACDs on network 100 will appear to HACDs on network 110 as if they were of the same home automation technology and on the same home automation network. In this embodiment therefore, HACDs on network 110 can communicate and interoperate with HACDs on different network 100 using different home automation technology in a peer-to-peer manner as described in the '378 application despite the fact that the communicating HACDs are on networks that use different home automation technology.

According to one embodiment, a gateway 105 is configured to support multiple home automation networks (100, 110, 115). The maximum number of networks a single gateway 105 can support may be based at least in part on, for example, the number of HACDs on each network (100, 110, 115), anticipated network traffic between HACDs, the specific task each network owner has requested, and other environment factors.

Figure 2:
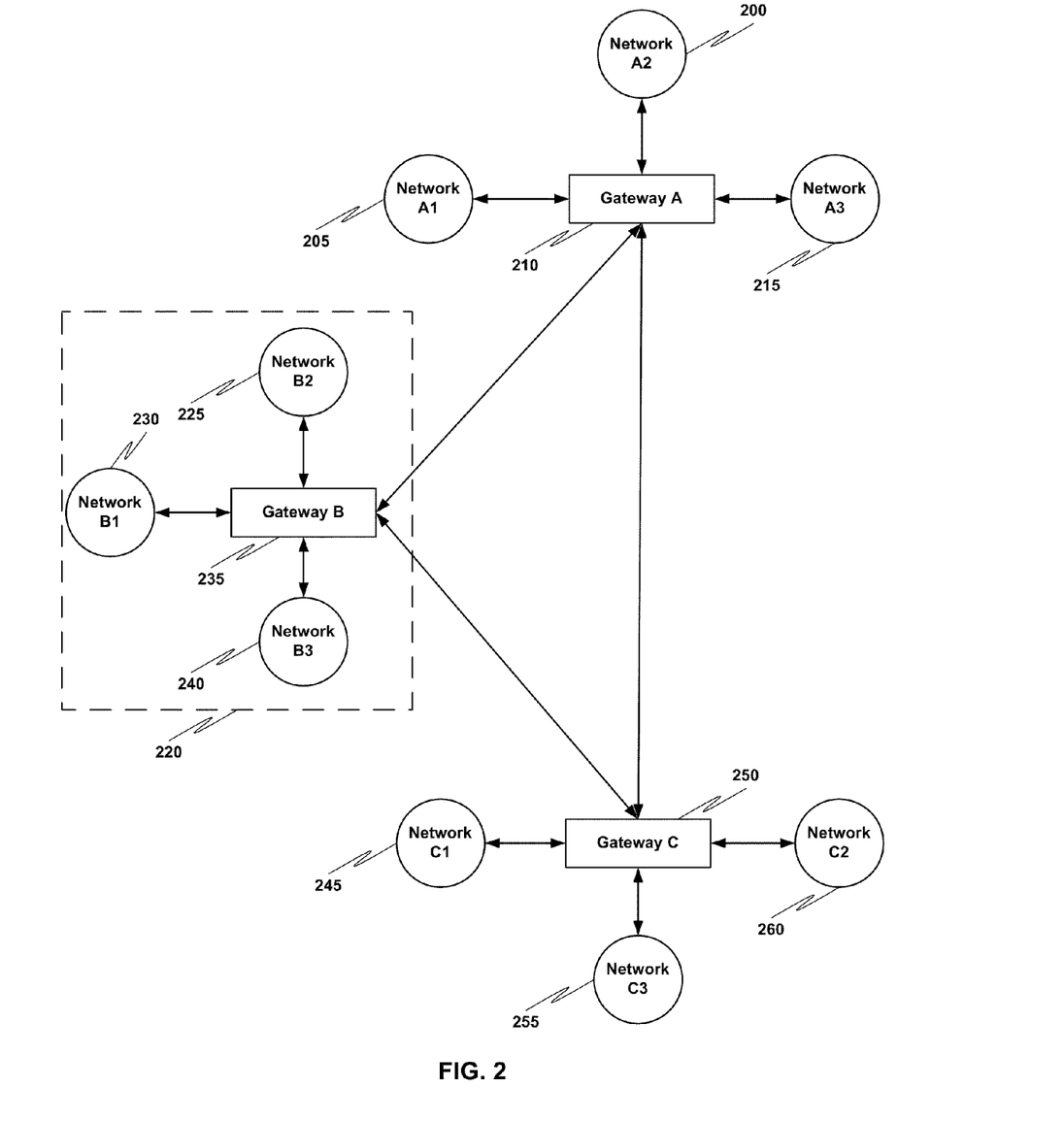
FIG. 2 is a block diagram that illustrates a system of intelligent gateways for heterogeneous peer-to-peer home automation networks in accordance with one embodiment.

FIG. 2 is a block diagram that illustrates a system of intelligent gateways for heterogeneous peer-to-peer home automation networks in accordance with one embodiment. In this mode, multiple networked gateways (210, 235, 250) serve multiple heterogeneous home automation networks. As shown in FIG. 2, gateway 210 serves heterogeneous networks 200, 205, and 215, gateway 235 serves heterogeneous networks 225, 230, and 240, and gateway 250 serves heterogeneous networks 245, 255, and 260. Multiple gateways (210, 235, 250) can be interconnected to provide increased scalability for larger scale deployment involving a large number of home automation networks. In this configuration, one gateway (210, 235, 250) is assigned to manage a specific set of heterogeneous home automation networks (networks (200, 205, 215), networks (225, 230, 240), and networks (245, 255, 260), respectively) and multiple such gateways (210, 235, 250) are interconnected to connect multiple sets 220 of heterogeneous home automation networks to form a larger network.

The embodiment illustrated in FIG. 2 allows a large number of heterogeneous home automation networks and associated HACDs to be interconnected through a collection of interconnected gateways (210, 235, 250). Through the function of the gateways (210, 235, 250), HACDs on any one home automation network can communicate and interoperate with HACDs on any other home automation network in a peer-to-peer manner as described in the '378 application, despite the fact that the communicating HACDs are on networks that use different home automation technology.

The communication protocols between gateways (210, 235, 250) can be any communication protocols for communicably coupling communication devices. According to one embodiment, gateways (210, 235, 250) are interconnected via the Internet, and communication between gateways (210, 235, 250) is based at least in part on a communication protocol that is based on the Internet protocol TCP/IP. In the context of the present disclosure, the communication network between gateways (210, 235, 250) is called the "Inter-Gateway Network," and the communication protocol between gateways (210, 235, 250) is called the "Inter-Gateway Protocol."

The networked gateways (210, 235, 250) configuration also extends the distance limitation inherent in certain home automation technologies. For example, Z-Wave® technology has a wireless range of only 30 meters. Through one or multiple gateways (210, 235, 250), HACDs on one home automation network can communicate and interoperate with HACDs on any other home automation network without a distance limitation because the distance limitation between interconnected gateways (210, 235, 250) may be eliminated depending on the technologies used to interconnect the gateways (210, 235, 250). The networked gateways configuration can take on any traditional networking topologies as the environment requires.

Referring again to FIG. 1, FIG. 1 may be used, for example, to represent a scenario where a group of houses in a neighborhood utilizes a single gateway 105 to connect different home automation networks (100, 110, 115) located inside each house to jointly reduce power consumption by a certain user-specified percentage. In more detail, network 100 could be Insteon™-based home automation technology and belongs to a first household. Network 110 could be ZigBee®-based home automation technology and belong to a second household. The gateway 105 allows HACD-connected electrical appliances in the first household to collaborate with HACD-connected electrical appliances in the second household to achieve electricity savings as required by the owner of the first household and/or the second household, as described in the '378 application.

Referring again to FIG. 2, with deployment of multiple gateways (210, 235, 250) which communicate among each other and their respective home automation networks, HACD-connected electrical appliances in one neighborhood can communicate with HACD-connected electrical appliances in other neighborhoods, thus creating a larger peer-to-peer network. This embodiment allows heterogeneous home automation networks anywhere in the world to be connectable to one another to achieve increased scalability, to the point that potentially every home automation network in the world with a gateway assigned to it can become part of a global home automation network. Every household in the world could potentially possess the technology to jointly reduce the consumption of energy with other households in a peer-to-peer manner as described in the '378 application despite the fact that the communicating HACDs are on networks that use different home automation technology.

Figure 3:
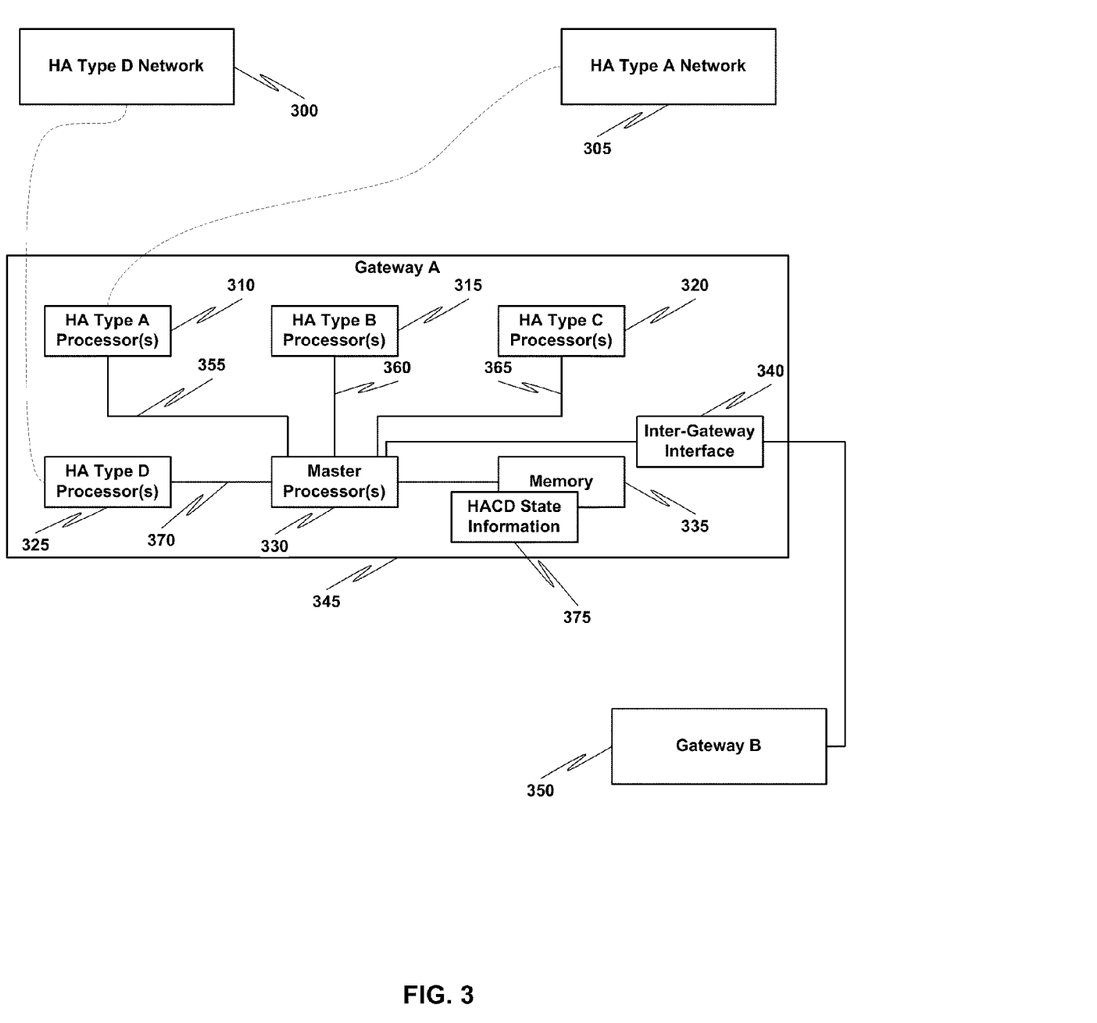
FIG. 3 is a block diagram that illustrates an intelligent gateway for heterogeneous peer-to-peer home automation networks in accordance with one embodiment.

FIG. 3 is a block diagram that illustrates an intelligent gateway for heterogeneous peer-to-peer home automation networks in accordance with one embodiment. Gateway 345 comprises one or more processors (310, 315, 320, and 325) for each home automation technology supported by the gateway 345. Gateway 345 simultaneously supports four heterogeneous home automation technologies: one or more processors 310 support a first type of home automation technology for network 305, one or more processors 315 support a second type of home automation technology, one or more processors 320 support a third type of home automation technology, and one or more processors 325 support a fourth type of home automation technology for network 300. Gateway 345 also comprises one or more master processors 330 configured to interoperate with one or more processors 310, 315, 320, and 325 through independent circuitry and communication protocol specific to each particular home automation technology. Gateway 345 also comprises an inter-gateway interface 340 configured to interface between gateway 345 and one or more other gateways 350. Gateway 345 also comprises a memory for storing information comprising HACD state information. The HACD state information may comprise information about home automation networks supported by the gateway 345 and HACDs within each of the home automation networks supported by the gateway 345. The HACD state information may also include the same type of information for other gateways 350 coupled to gateway 345.

For example, if gateway 345 was intended to bridge Echelon® networks with Z-Wave® networks, Insteon™ networks, and ZigBee® networks, gateway 345 may comprise an Echelon® Neuron chip and supporting circuitry, a Z-Wave® (Zensys) chip and supporting circuitry, an Insteon™ chip and supporting circuitry, and a ZigBee® chip and supporting circuitry. Circuitry and software to support a specific home automation network (such as Echelon® or Z-Wave®) are well known in the art and are not described here.

Figure 4:
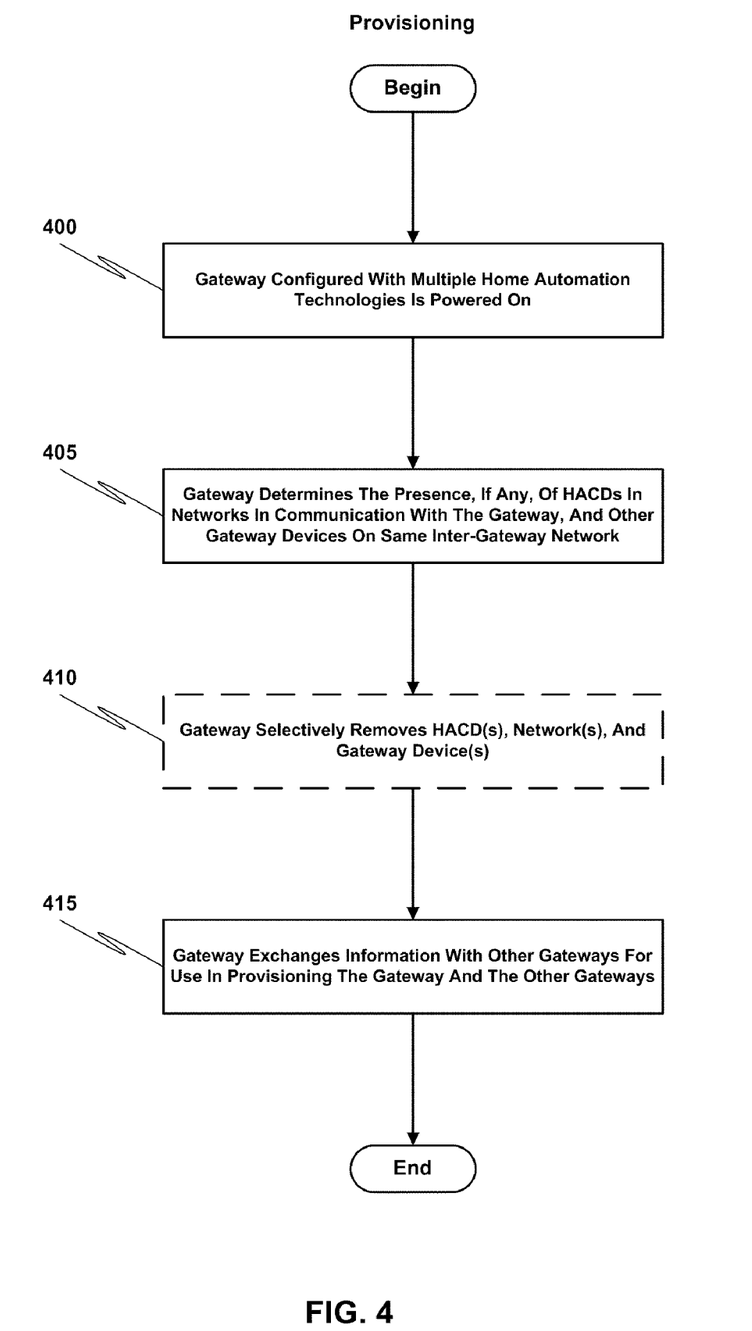
FIG. 4 is a flow diagram that illustrates a method for provisioning a gateway for heterogeneous peer-to-peer home automation in accordance with one embodiment.

FIG. 4 is a flow diagram that illustrates a method for provisioning a gateway for heterogeneous peer-to-peer home automation in accordance with one embodiment. The process steps illustrated in FIG. 4 may be implemented in hardware, software, or a combination thereof. For example, the process steps illustrated in FIG. 4 may be performed by gateway 345 of FIG. 3. At 400, a gateway 345 configured with multiple home automation technologies (e.g. Insteon™ home automation technology and Echelon® home automation technology) is powered on. At 405, the gateway 345 determines the presence, if any, of HACDs in networks that are in communication with the gateway 345 and for which the gateway 345 is configured to support, and possibly other gateways 350 on the same inter-gateway network. For example, if the gateway 345 is configured to support Insteon™ and Echelon® HACDs, at 405 gateway 345 discovers all of the HACDs on an Insteon™ network 300 and all of the HACDs on an Echelon® network 305 according to the respective discovery mechanisms of Insteon™ technology and Echelon® technology. The respective discovery mechanisms are well known in the art and will not be described here. In the present example, during initialization, gateway 345 will appear to an Insteon™ HACD it discovers as if it were a collection of Insteon™ HACDs when in fact, this collection of Insteon™ HACDs actually comprises Echelon® devices in the Echelon® home automation network. Similarly, gateway 345 will appear to an Echelon® HACD it discovers as if it were a collection of Echelon® HACDs when in fact, this collection of Echelon® HACDs actually comprises Insteon™ HACDs in the Insteon™ home automation network.

Each home automation technology employs its own addressing scheme. For example, the Echelon® device addressing scheme comprises a physical address, device address, group address and broadcast address. According to one embodiment, a gateway 345 mimics the addressing scheme of each of the home automation technologies the gateway 345 supports, such that a collection of HACDs of a first type will appear, through the Gateway, to a HACD of a second type as a collection of HACDs of a second type and each with a unique address of the second type.

Referring again to FIG. 4, at 410 the gateway 345 optionally selectively removes one or more HACDs, networks, and gateways. According to one embodiment, a gateway 345 provides a user interface (via for example an LCD display panel and keypad) to allow discovered home automation network (s) and/or selected HACDs within that network to be removed from the coverage of gateway 345.

Gateway 345 simultaneously discovers, if available, other gateways 350 on the same inter-gateway network. One example of a gateway network is the public Internet. For example, gateway 345 discovers the presence of another gateway 350 via one of the established inter-gateway protocols. Gateway 345 can optionally be configured to remove other gateways automatically discovered or selected HACDs managed by other selected gateways 350 through an optional user interface (via for example an LCD display panel and keypad) at the discretion of the administrator of gateway 345.

Referring again to FIG. 4, at 415 gateway 345 and another gateway 350 exchange information (based on any agreed upon inter-gateway protocol) to provision each other. The data exchanged may include, for example, the identity of the gateway (345, 350), the home automation networks supported by the gateway (345, 350), the owner of the gateway (345, 350), billing and accounting information, a list of HACDs and their current status, and other gateway provisioning data. In this process, gateway 345 seeks permission for the other gateway 350 to join its network and the other gateway 350 seeks permission from gateway 345 to join its network.

If the provisioning data of multiple gateways (345, 350) allow each other to be automatically joined into each other's network, then the gateways (345, 350) are said to be bound. This process is called "binding." According to one embodiment, binding is associative, thus if gateway A binds with gateway B and if gateway B binds with gateway C, then gateway A automatically binds with gateway C through gateway B which automatically transfers all of the provisioning data of gateway C to gateway A (and conversely from gateway A to gateway C).

According to one embodiment, during the binding process, gateway 345 identifies all of the HACDs currently managed by gateway 345 to gateway 350; and gateway 350 identifies all of the HACDs currently managed by gateway 350 to gateway 345. After this process, each gateway (345, 350) will automatically have all of the data and characteristics of all of the HACDs addressable through other gateways it has established "binding" with. Subsequently, each gateway (345, 350) will appear to the home automation network(s) it has direct connection with as a collection of HACDs of the same home automation technology and on the same home automation network when in fact, this collection of HACDs actually are of different home automation technologies and reside on other home automation networks managed by other gateways.

According to one embodiment, gateways (345, 350) are configured to maintain communication with other gateways it has already established binding with through for example, "stay alive" message as defined by the agreed upon the inter-gateway protocols. Gateway 345 is configured to, if it "looses connection" with another gateway 350 it has previously established binding with, attempt to re-establish connection with gateway 350 according to the agreed upon inter-gateway protocols. Gateway 345 is configured to, if it looses connection with gateway 350 and cannot recover within an allowed time threshold, temporarily deactivate and archive the table containing all of the previously addressable HACDs under gateway 350. If the network connection between gateway 345 and gateway 350 is recovered, the archived table can be restored. Gateway 345 is further configured to automatically notify, in accordance with the respective home automation technologies, all of the HACDs it has direct connection with about the loss and recovery of the HACDs under gateway 350.

According to one embodiment, it is the responsibility of each gateway (345, 350) to keep a current list of all of the HACDs it manages, and to propagate any HACD status changes (such as the addition of a new HACD, the removal of an existing HACD, etc.) to all of the home automation networks the gateway (345, 350) has direct connection with and to all other gateways the gateway (345, 350) has bindings with.

Figure 5:
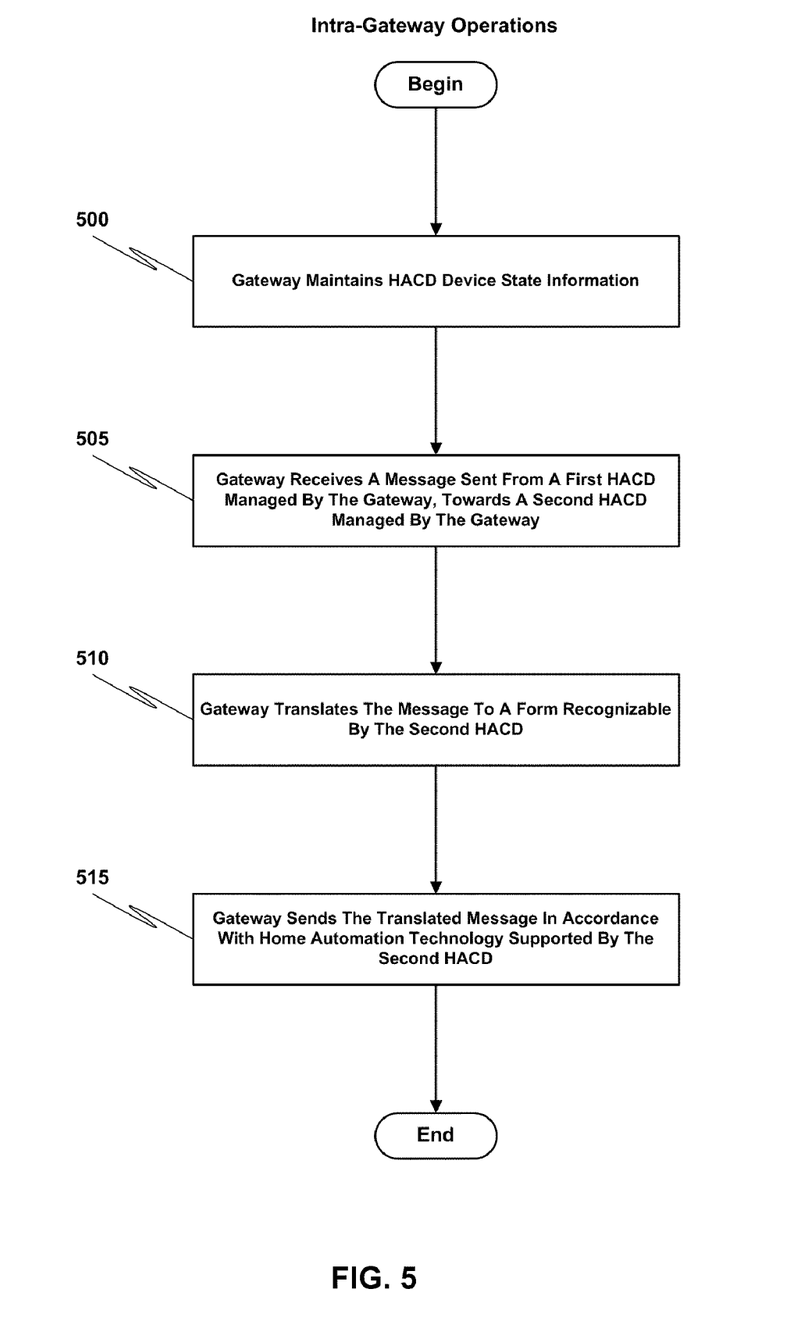
FIG. 5 is a flow diagram that illustrates a method for intra-gateway communication for heterogeneous peer-to-peer home automation in accordance with one embodiment.

FIG. 5 is a flow diagram that illustrates a method for intra-gateway communication for heterogeneous peer-to-peer home automation in accordance with one embodiment. The process steps illustrated in FIG. 5 may be implemented in hardware, software, or a combination thereof. For example, the process steps illustrated in FIG. 5 may be performed by gateway 345 of FIG. 3. At 500, during operation, a gateway 345 maintains information 375 regarding addressable HACDs in home automation network(s) it has direct connection with. It is the responsibility of the gateway 345 to keep this information 375 current via the methodologies dictated by each of the home automation technologies this gateway 345 is configured to support.

According to one embodiment, a HACD (originating HACD) under the management of a gateway 345 may send a peer-to-peer message to an HACD (destination HACD) also under the management of gateway 345 even when the originating HACD and the destination HACD are of different home automation technologies. At 505, the peer-to-peer message is intercepted by the gateway 345. At 510, the gateway 345 examines the message content and reformats the message into a format recognizable by the destination HACD. At 515, the gateway 345 sends the translated message towards the destination HACD in accordance with the home automation technology supported by the destination HACD. This process is performed transparently to the originating HACD.

When the destination HACD receives the translated message, it formulates a response message in accordance with a pre-established algorithm, for example as described in the '378 application. The destination HACD subsequently sends the response message based on the home automation technology it supports towards the originating HACD.

The process steps illustrated in FIG. 5 are repeated for the response message, with the roles of the respective HACDs being reversed; what was the originating HACD becomes the destination HACD and what was the destination HACD becomes the originating HACD. The response message is intercepted (505) by the gateway 345 which in turn examines the response message content and translates (510) it into a format recognizable by the originating HACD. The response message is then sent (515) towards the originating HACD by the gateway 345 in accordance with the home automation technology supported by the originating HACD. The originating HACD receives the response message and proceeds with other operations as dictated by its peer-to-peer algorithms.

Figure 6:
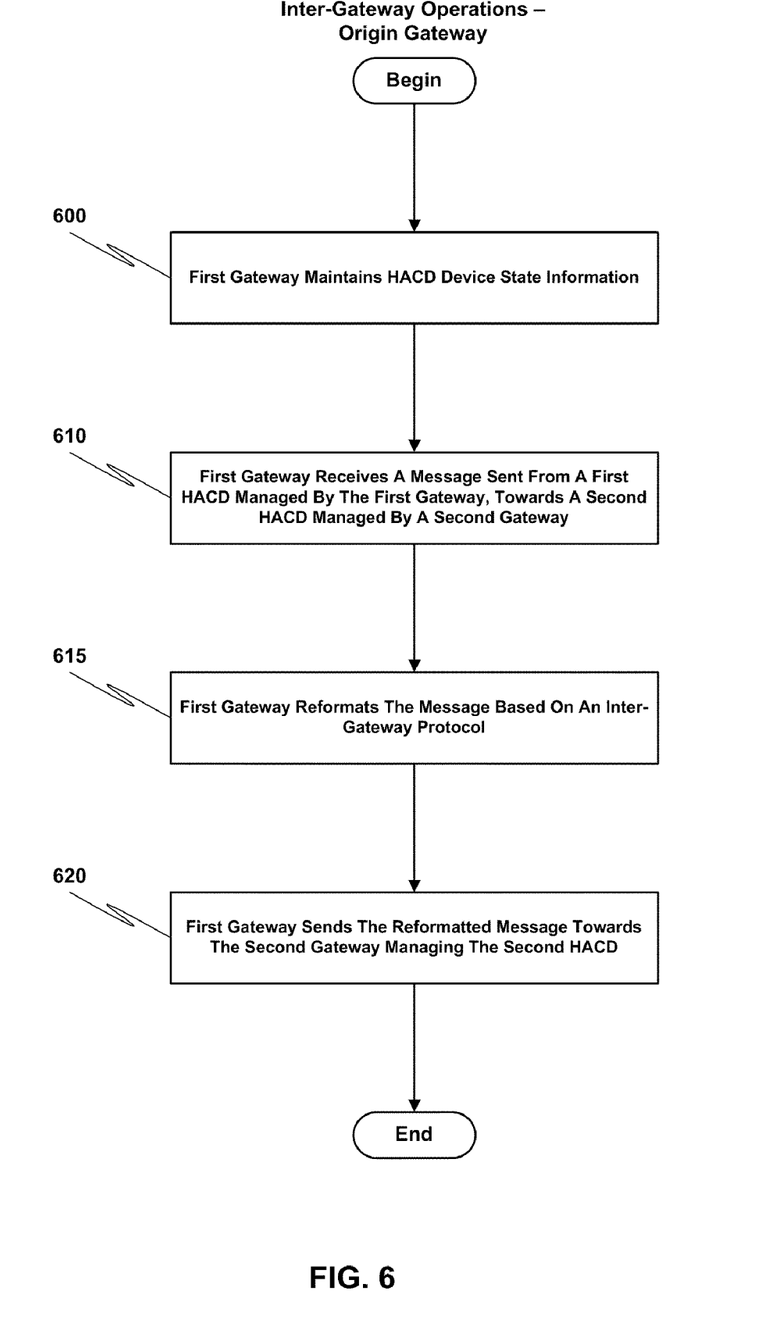
FIG. 6 is a flow diagram that illustrates a method for inter-gateway communication for heterogeneous peer-to-peer home automation, from the perspective of an origin gateway, in accordance with one embodiment.

FIG. 6 is a flow diagram that illustrates a method for inter-gateway communication for heterogeneous peer-to-peer home automation, from the perspective of an origin gateway, in accordance with one embodiment. The process steps illustrated in FIG. 6 may be implemented in hardware, software, or a combination thereof. For example, the process steps illustrated in FIG. 6 may be performed by gateway 345 of FIG. 3. At 600, during operation, a first gateway 345 maintains information 375 regarding the addressable HACDs in the home automation networks the first gateway 345 currently manages. The first gateway 345 also maintains information regarding other gateways 350 it has established binding with and the addressable HACDs currently being managed by all such gateways 350. It is the responsibility of each gateway (345, 350) to keep this information current.

Still referring to FIG. 6, at 610, when a first HACD (originating HACD) under the direct management of a first gateway 345 sends a peer-to-peer message to a second HACD (destination HACD) managed by a second gateway 350, the peer-to-peer message is received or intercepted by the first gateway 345. At 615, the message content is examined and reformatted into a format in accordance with a predetermined inter-gateway protocol. The first gateway 345 determines from its state information 375 that the destination HACD is actually managed the second gateway 350. At 620, the first gateway 345 sends the reformatted message towards the second gateway 350 which is currently managing the destination HACD. The exact format of the message between the first gateway and the second gateway depends on the actual inter-gateway protocol used.

Figure 7:
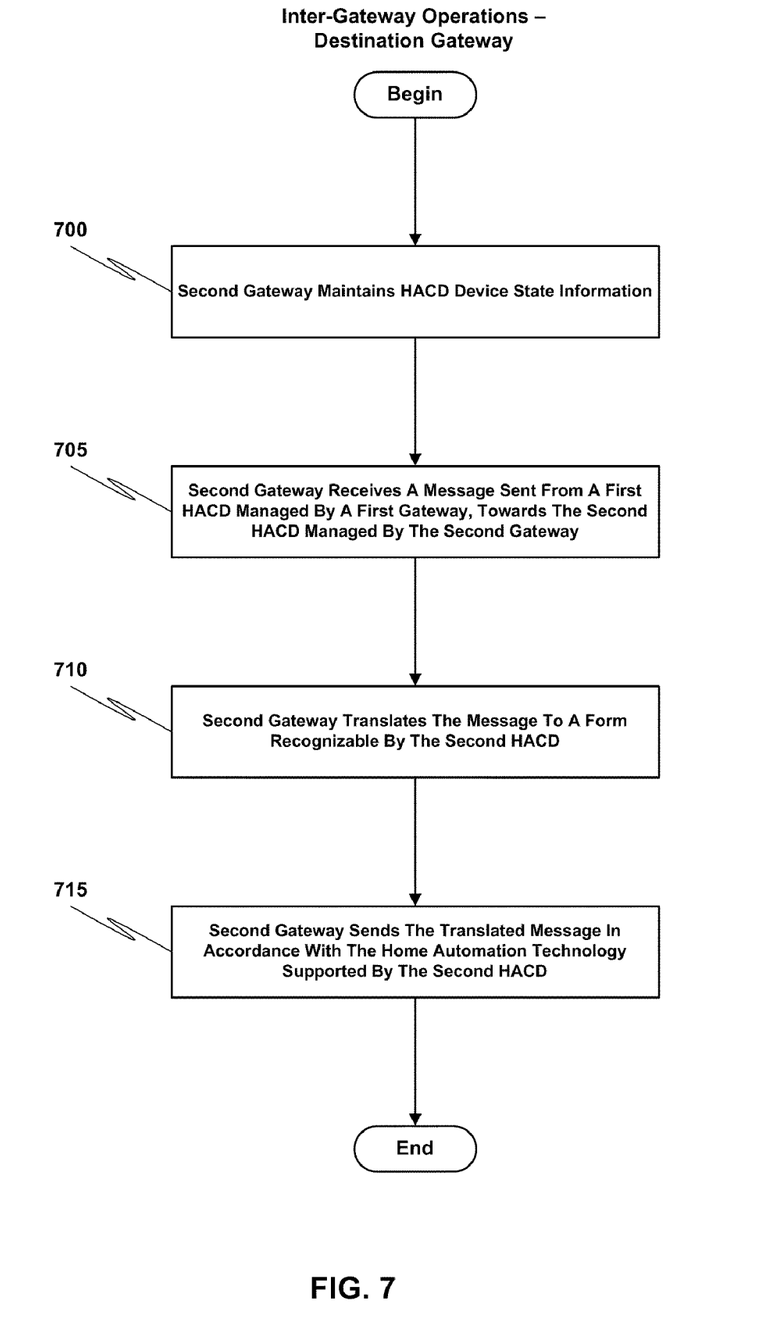
FIG. 7 is a flow diagram that illustrates a method for inter-gateway communication for heterogeneous peer-to-peer home automation, from the perspective of a destination gateway, in accordance with one embodiment.

FIG. 7 is a flow diagram that illustrates a method for inter-gateway communication for heterogeneous peer-to-peer home automation, from the perspective of a destination gateway, in accordance with one embodiment. The process steps illustrated in FIG. 7 may be implemented in hardware, software, or a combination thereof. For example, the process steps illustrated in FIG. 7 may be performed by gateway 350 of FIG. 3. At 700, during operation, a second gateway 350 maintains information regarding the addressable HACDs in the home automation networks the second gateway 350 currently manages. The second gateway 350 also maintains information regarding other gateways 345 it has established binding with and the addressable HACDs currently being managed by all such gateways 345. It is the responsibility of each gateway (345, 350) to keep this information current. At 705, the second gateway 350 receives a message sent from a first HACD managed by a first gateway 345 and forwarded by the first gateway 345 in inter-gateway protocol format to a second HACD managed by the second gateway 350. The second gateway 350 determines the actual address of the destination HACD. At 710, the second gateway 350 translates the message into a format recognizable by the second HACD. At 715, the second gateway 350 transmits the translated message in accordance with the home automation technology supported by the second HACD. These steps are performed transparently to the first HACD.

When the second HACD receives this message, the second HACD formulates a response message in accordance with its pre-established peer-to-peer algorithms. The second HACD subsequently sends the response message in the home automation technology it supports towards the first HACD.

The process steps illustrated in FIGS. 6 and 7 are repeated for the response message, with the roles of the respective HACDs being reversed; what was the originating HACD becomes the destination HACD and what was the destination HACD becomes the originating HACD. The response message is intercepted or received (610) by the gateway for the second HACD (in this case, the second gateway 350). The second gateway 350 examines the response message content and reformats (615) it in accordance with the agreed upon inter-gateway protocol and sends (620) the message towards the gateway responsible for the originating HACD, which is the first gateway 345.

The first gateway 345, upon receiving (705) the response message, determines that the message is destined for the first HACD, translates (710) the message into a format recognizable by the first HACD and sends (715) the message towards the first HACD in accordance with the home automation technology supported by the first HACD. The first HACD receives the response message and proceeds with other operations as dictated by its peer-to-peer algorithms.

While peer-to-peer home automation has been described above in the context of energy management, there are many other types of home automation applications without departing from the inventive concepts described herein. For example, embodiments of the present invention may be applied to home elderly care, home security, home surveillance, home entertainment, etc., wherein HACD-type devices act in a peer-to-peer manner to jointly achieve a predetermined goal.

Additionally, while peer-to-peer home automation has been described above in the context of two "peers," embodiments of the present invention may be applied peer-to-peer home automation networks having three or more peer home automation control devices.

Figure 8:
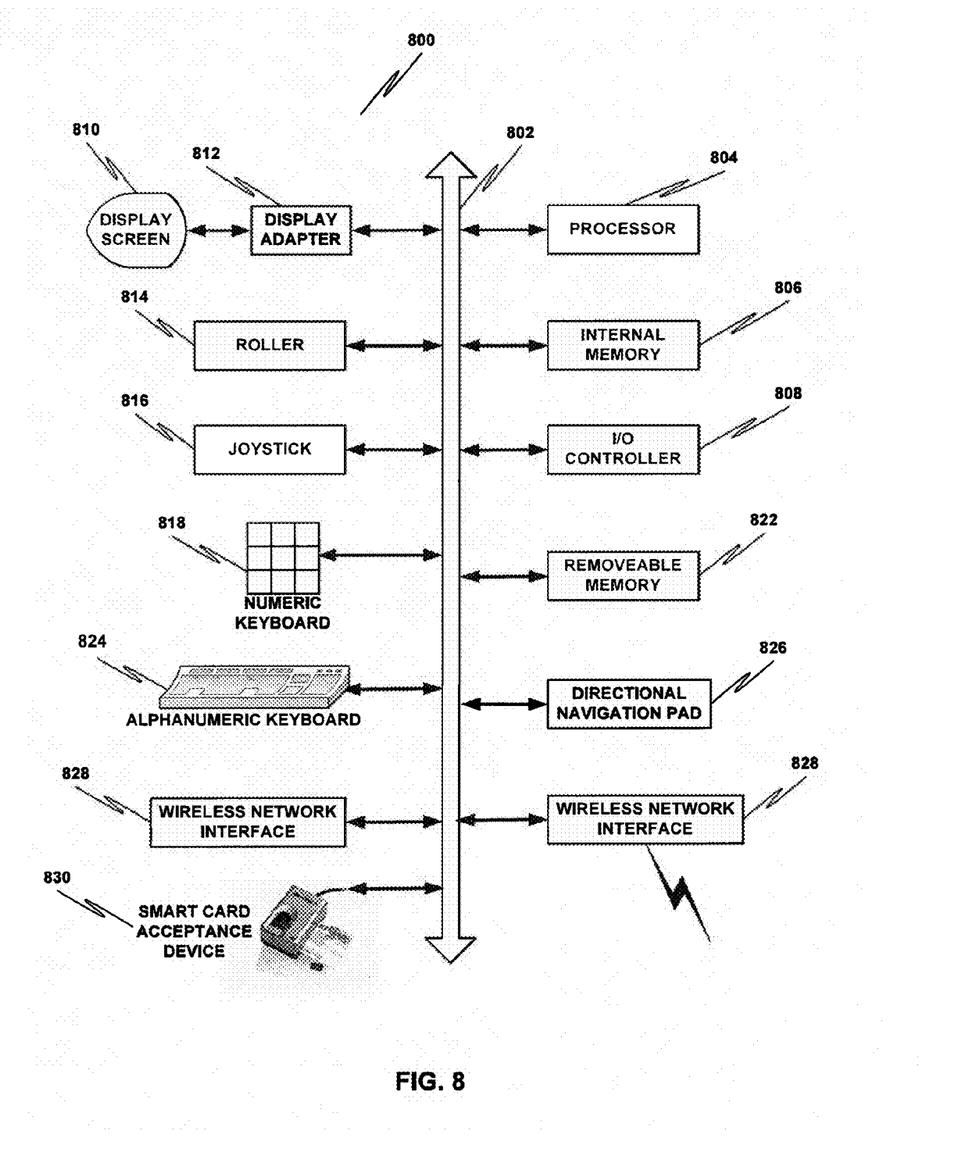
FIG. 8 is a block diagram of a computer system suitable for implementing aspects of the present disclosure.

FIG. 8 depicts a block diagram of a computer system 800 suitable for implementing aspects of the present invention. As shown in FIG. 8, system 800 includes a bus 802 which interconnects major subsystems such as a processor 804, an internal memory 806 (such as a RAM), an input/output (I/O) controller 808, a removable memory (such as a memory card) 822, an external device such as a display screen 810 via display adapter 812, a roller-type input device 814, a joystick 816, a numeric keyboard 818, an alphanumeric keyboard 824, directional navigation pad 826, smart card acceptance device 830, and a wireless interface 820. Many other devices can be connected. Wireless network interface 820, wired network interface 828, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 8 to be present to practice the present invention. Furthermore, the devices and subsystems may be interconnected in different ways from that shown in FIG. 8. Code to implement the present invention may be operably disposed in internal memory 806 or stored on storage media such as removable memory 822, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
at a network device configured to support a plurality of home automation technologies, determining a presence of one or more home automation control devices (HACDs) in one or more peer-to-peer networks communicatively coupled to the network device, each of the HACDs configured as a peer device in one of the peer-to-peer networks, each of the HACDs further configured to negotiate with other HACDs to agree to a task to deliver an optimized performance based at least in part on a first energy savings goal of a HACD configured to control a first electrical appliance and a second energy savings goal of a second HACD configured to control a second electrical appliance, the optimized performance comprising an optimization in energy usage of the first electrical appliance or the second electrical appliance; and
determining a presence of one or more other network devices configured to support a plurality of home automation technologies; and
when the one or more other network devices are determined to be present, exchanging information with the one or more other network devices, the information comprising:
an identification of the one or more other network devices;
an identification of one or more home automation networks supported by the one or more other network devices; and
an identification of one or more HACDs in the one or more home automation networks supported by the one or more other network devices.

2. The method of claim 1, further comprising maintaining communication with the one or more other network devices.

3. The method of claim 1, further comprising mimicking an addressing scheme of each of the plurality of home automation technologies.

4. The method of claim 1 wherein the network device comprises a memory for storing information comprising HACD state information.

5. The method of claim 1 wherein the plurality of home automation technologies comprises two or more of:
Zigbee® technology;
Insteon® technology;
Echelon LonWorks® technology; and
Z-Wave® technology.

6. The method of claim 1 wherein each of the HACDs comprise a data store for storing status information regarding all peer devices in the peer-to-peer network including the HACD.

7. The method of claim 1, further comprising executing a task to achieve the optimized performance.

8. A method comprising:
at a network device configured to support a plurality of home automation technologies, receiving a message sent from a first home automation control device (HACD) managed by the network device, towards a second HACD managed by the network device, the network device communicatively coupled to one or more peer-to-peer networks, each of the one or more peer-to-peer networks comprising one or more HACDs configured as a peer in one of the peer-to-peer networks, each of the HACDs further configured to negotiate with other HACDs to agree to a task to deliver an optimized performance based at least in part on a first energy savings goal of a HACD configured to control a first electrical appliance and a second energy savings goal of a second HACD configured to control a second electrical appliance, the optimized performance comprising an optimization in energy usage of the first electrical appliance or the second electrical appliance;
translating the message to a form recognizable by the second HACD; and
sending the translated message towards the second HACD in accordance with home automation technology supported by the second HACD.

9. The method of claim 8, further comprising maintaining communication with the one or more other network devices.

10. The method of claim 8, further comprising mimicking an addressing scheme of each of the plurality of home automation technologies.

11. The method of claim 8 wherein the network device comprises a memory for storing information comprising HACD state information.

12. The method of claim 8 wherein the plurality of home automation technologies comprises two or more of:
Zigbee® technology;
Insteon® technology;
Echelon LonWorks® technology; and
Z-Wave® technology.

13. The method of claim 8 wherein each of the HACDs comprise a data store for storing status information regarding all peer devices in the peer-to-peer network including the HACD.

14. The method of claim 8, further comprising executing a task to achieve the optimized performance.

15. A method comprising:
at a network device configured to support a plurality of home automation technologies, receiving a message sent from a first home automation control device (HACD) managed by the network device, towards a second HACD managed by a second network device configured to support a plurality of home automation technologies, the network device communicatively coupled to one or more peer-to-peer networks, each of the one or more peer-to-peer networks comprising one or more HACDs configured as a peer in one of the peer-to-peer networks, each of the HACDs further configured to negotiate with other HACDs to agree to a task to deliver an optimized performance based at least in part on a first energy savings goal of a HACD configured to control a first electrical appliance and a second energy savings goal of a second HACD configured to control a second electrical appliance, the optimized performance comprising an optimization in energy usage of the first electrical appliance or the second electrical appliance;

reformatting the message based at least in part on a protocol for communications between the first network device and the second network device; and sending the reformatted message towards the second network device.

16. The method of claim 15, further comprising maintaining communication with the one or more other network devices.

17. The method of claim 15, further comprising mimicking an addressing scheme of each of the plurality of home automation technologies.

18. The method of claim 15 wherein the network device comprises a memory for storing information comprising HACD state information.

19. The method of claim 15 wherein the plurality of home automation technologies comprises two or more of:
Zigbee® technology;
Insteon® technology;
Echelon LonWorks® technology; and
Z-Wave® technology.

20. The method of claim 15 wherein each of the HACDs comprise a data store for storing status information regarding all peer devices in the peer-to-peer network including the HACD.

21. The method of claim 15, further comprising executing a task to achieve the optimized performance.

* * * * *